United States Patent [19]
Ball et al.

[11] Patent Number: 5,271,655
[45] Date of Patent: Dec. 21, 1993

[54] WINDOW WHICH CAN BE FASTENED IN A FOLDING TOP BY MEANS OF A ZIPPER, AND A PROCESS FOR EXCHANGING A SURFACE SECTION

[75] Inventors: Wilfried Ball, Dingolfing; Heinz Schönenbach, Remscheid; Ludwig Bolte, Kirchheim; Michael Stahmer, München; Horst Karl, Unterföhring, all of Fed. Rep. of Germany

[73] Assignee: Bayerische Motoren Werke AG, Fed. Rep. of Germany

[21] Appl. No.: 772,833

[22] Filed: Oct. 8, 1991

[30] Foreign Application Priority Data

Oct. 8, 1990 [DE] Fed. Rep. of Germany ....... 4031866

[51] Int. Cl.⁵ .............................. B60J 1/18; B60J 7/12
[52] U.S. Cl. ................... 296/146.14; 296/107; 160/368.1; 160/DIG. 18
[58] Field of Search ............... 296/107, 116, 146 M, 296/146 L, 201; 24/387–388, 390, 418; 160/327, 354, 368.1, 383, 403, DIG. 18

[56] References Cited

U.S. PATENT DOCUMENTS 2,928,127  3/1960  Armstrong ........................ 264/257
5,040,844  8/1991  Stocz et al. ........................ 296/107

FOREIGN PATENT DOCUMENTS

| | | |
|---|---|---|
| 0284931 | 10/1988 | European Pat. Off. ........ 296/146 L |
| 2925563 | 1/1981 | Fed. Rep. of Germany ... 296/146 M |
| 3434026 | 3/1986 | Fed. Rep. of Germany ... 296/146 M |
| 8808137 | 10/1988 | Fed. Rep. of Germany . |
| 3719429 | 12/1988 | Fed. Rep. of Germany . |
| 3821457 | 12/1989 | Fed. Rep. of Germany ...... 296/201 |
| 3841035 | 6/1990 | Fed. Rep. of Germany . |
| 0413825 | 7/1934 | United Kingdom .................. 24/387 |
| 503371 | 4/1939 | United Kingdom . |

Primary Examiner—Dennis H. Pedder
Attorney, Agent, or Firm—Evenson, McKeown, Edwards & Lenahan

[57] ABSTRACT

A window 3 of the folding top of a convertible, which consists of a transparent flexible plastic material, on its interior side, is provided with a surrounding zipper 2 which, by means of a holding strip 4 and 5, is undetachably fastened to the interior side of a top covering 1 and to the window 3. Furthermore, it is provided on its exterior side with a U-shaped edge bordering 8 made of a rubber-elastic material which, in the installed condition of the window 3, rests sealingly against the edge of the window opening 1' of the top covering 1.

4 Claims, 2 Drawing Sheets

WINDOW WHICH CAN BE FASTENED IN A FOLDING TOP BY MEANS OF A ZIPPER, AND A PROCESS FOR EXCHANGING A SURFACE SECTION

BACKGROUND AND SUMMARY OF THE INVENTION

The invention relates to a window which can be fastened in a folding top by way of a zipper and to a process for exchanging a surface section.

An edge strip is applied by gluing and/or sewing to the window in a known manner and consisting of a flexible plastic material. On the edge strip, in turn,—if necessary, with the insertion of a fastening strip—the edge of the window opening of the top covering is fastened by a glued connection. However, not only is the establishment of this glued connection cumbersome and time-consuming, but when an exchange is required of a plastic window having scratches or similar damage, the glued connection must be opened up in a very time-consuming manner.

It is therefore an object of the invention, in the case of a window that can be fastened to the covering of a folding top, to construct the edge strip such that it can rapidly, easily and as often as desired be connected with the edge of the window opening of the top covering. In addition, a process is provided for establishing a detachable connection of a surface section, particularly a window, with the covering of the folding top.

For achieving this object, the present invention provides a U-shaped edge bordering which sealingly rests against the edge of the window opening of the top covering and a process for exchanging a surface section such that, when the folding top is almost completely folded open, a new surface section, which has the U-shaped edge bordering, is arranged on the inside of the surface to be exchanged, and the holding strip of the first part of the zipper is fastened to the fastening strip, the surface section to be exchanged is removed from the edge area of the covering, the edge of the covering is inserted into the U-shaped edge bordering.

Since the edge strip according to the invention is designed as a U-shaped edge bordering, for the receiving of the edge of the window opening of the top covering, only the exterior leg of the U-shaped edge bordering must be bent slightly toward the outside and the covering must be inserted into it, in which case the edge bordering will finally rest watertightly against the top covering because of the internal tension of its rubber-elastic material. This can not only be carried out rapidly and with comparatively low expenditures but can advantageously also be repeated as often as desired—thus during each required exchanging of a window—in which case the interacting parts are also not damaged.

Expediently, the U-shaped edge bordering consists of a rubber-elastic material, the interior leg carrying a sealing tape with a double-sided adhesive layer and resting against the top covering. The exterior side of the adhesive layer is covered by a paper strip which is pulled off before the top covering is inserted into the U-shaped edge bordering. By virtue of the sealing strip, the zipper is covered and, in addition, the sealing effect of the U-shaped edge bordering is increased.

The two legs of the U-shaped edge bordering extend in a slanted manner in the direction toward their free ends, the exterior leg being shorter than the interior leg. After the arranging of the top covering in the U-shaped edge bordering, as a result, an oblique plane is formed in its cross-section which extends to its exterior leg and by way of which a good running-off of the water is ensured on the edge area of the window opening of the top covering.

In the case of a rectangular rear window which is fastened according to the invention, the end sections of the zipper which face one another are penetrated by a U-shaped securing clamp, the end sections of the legs of the securing clamp resting, in a bent-away manner, against a counterplate on the interior side of the vehicle. As a result, an unauthorized removal of the rear window by way of the zipper is made considerably more difficult.

Although a method is known from the German Patent Document DE-OS 37 19 429 for exchanging of a flexible window or the like of a folding top, the new window must be sewn into the top covering which is not only very time-consuming but must normally also be carried out by an expert. In contrast, according to the present invention, a surface section, particularly a flexible rear window, provided with a zipper and a U-shaped edge bordering can be exchanged very rapidly and easily for a surface section connected with the top covering by means of sewing or the like. For this purpose, the widened holding strip of the first part of the zipper is only glued precisely to an existing interior fastening strip of the top covering and then the surface section to be exchanged is removed by the cutting-open of the sewed seam. Finally, the edge of the top covering is inserted into the U-shaped edge bordering. A window or similar surface section which is inserted by a zipper into a top covering in this manner can naturally also be replaced several times.

BRIEF DESCRIPTION OF THE DRAWINGS

An embodiment of the invention is shown in the drawing and will be explained in the following section wherein.

DETAILED DESCRIPTION OF THE DRAWINGS

Figure 1:
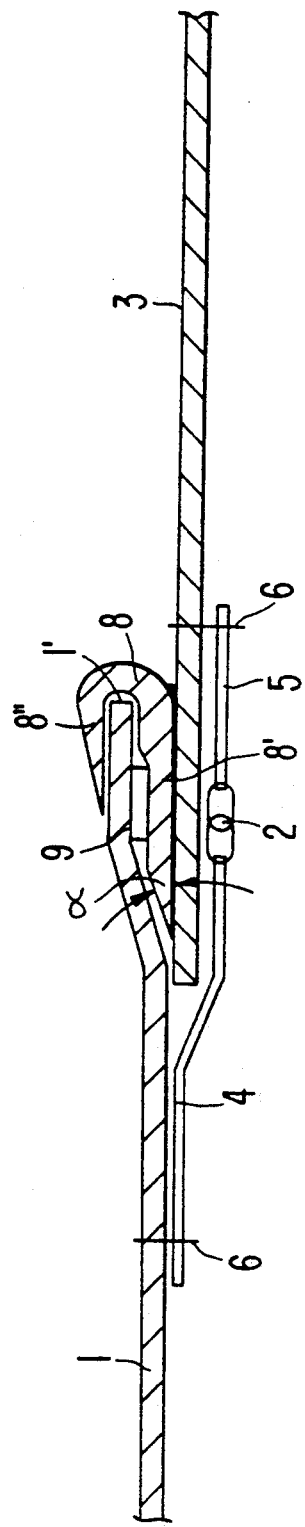
FIG. 1 is a sectional view of a flexible rear window fastened to a top covering by a zipper.

FIG. 1 illustrates a covering 1 of the folding top of a convertible which consists of a weatherproof textile material, a window 3 being detachably fastened to the edge area of the window opening 1' of the top covering 1 on the interior side of the vehicle by a zipper 2 extending along the window opening 1'. The window 3, which consists of a transparent flexible plastic material, is provided in the folding top as an approximately rectangular rear window. In addition, the zipper 2 comprises a first and a second part on which a holding strip 4 and 5 is undetachably mounted. In this case, holding strip 4 is fastened to the top covering 1, but holding strip 5 is fastened to the edge area of the window 3 by way of a seam 6 produced by gluing and/or sewing.

As also illustrated in FIG. 1, a U-shaped edge bordering 8, which consists of a rubber-elastic material and extends along the edge of the window 3, is fastened by way of gluing, welding and/or sewing to the exterior side of the window 3. On its interior leg 8', this edge bordering 8' carries a sealing strip 9 with a double-sided adhesive layer, the exterior side of the adhesive layer facing the top covering 1 being provided with a paper strip before the installation of the window 3. Finally, the interior leg 8' and the exterior leg 8" of the U-shaped edge bordering 8 extend in a slanted manner toward their free ends and, in the process, enclose with the edge of the window 3 an acute angle which is open toward its center area.

For the fastening of the window 3 to the edge of the window opening 1' of the top covering 1, the first and second part of the zipper 2 are connected with one another by way of the zipper slide, and the paper strip is removed from the adhesive layer of the sealing strip 9. Now the exterior leg 8" of the U-shaped edge bordering 8 is slightly bent toward the outside by a folding-leg-type or similar accessory tool, and then the edge of the window opening 1' of the top covering 1 is inserted into the U-shaped edge bordering 8. Finally, its outer leg 8", as a result of the inherent tension of the rubber-elastic material, rests sealingly against the edge of the window opening 1' of the top covering 1. For increasing the sealing effect, the exterior leg 8" of the U-shaped edge bordering 8 is now pressed against the sealing strip 9.

In the case of the approximately rectangular rear window of a folding top which corresponds to the window 3, the zipper 2 extends in one piece along the window edge, in which case the end sections of the zipper 2, which face one another, are situated in the center area of the lower broad side of the rear window. When the rear window is installed, the end sections of the zipper 2 are penetrated by the legs of a U-shaped securing clamp 11, in addition, the free end sections of the two legs penetrating a counterplate rest against the zipper in a bent-away manner. In this case, the counterplate has approximately the size of the zipper slide. As a result of the U-shaped securing clamp 11 and the counterplate held by it, an unauthorized removal of the rear window is made more difficult.

Figure 2:
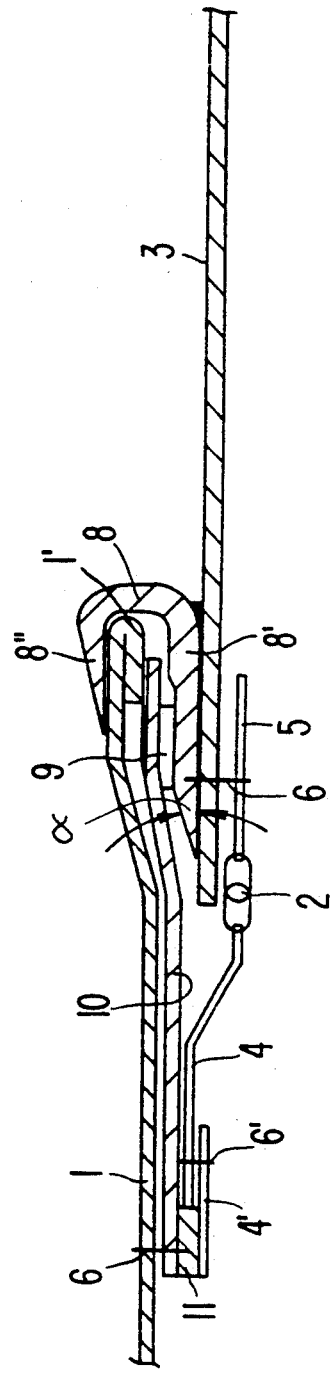
FIG. 2 is a fastening of the rear window which corresponds essentially to FIG. 1 but is retrofitted.
Figure 3:
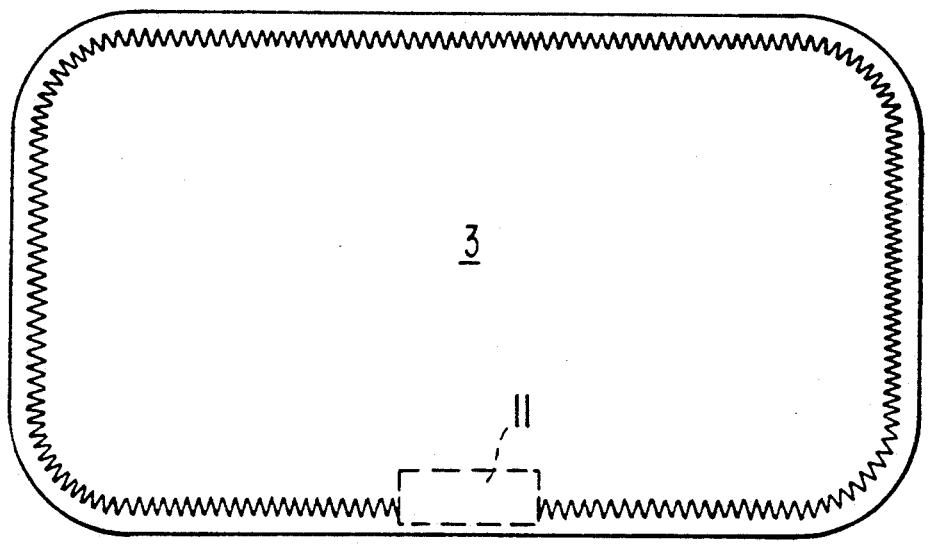
FIG. 3 is an elevational view showing an approximately rectangular-shaped rear window with end sections of the zipper disposed near a lower edge of the rear window.
Figure 4:
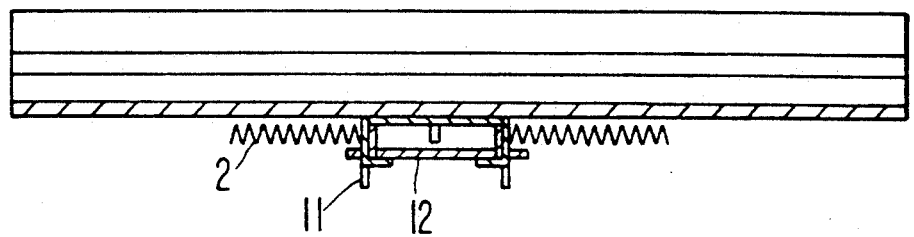

Although FIG. 2 illustrates the retrofitting of the window 3, the construction shown in this figure corresponds largely to the construction of FIG. 1. For this reasons, identical parts have the same reference numbers. A window 3 or similar surface section, which is provided with a U-shaped edge bordering 8 and a surrounding zipper 2, may also be provided in a comparatively simple manner on a folding top; thus, as a replacement of a window which is sewn into it or fastened to it in a similar manner. As illustrated in FIG. 2, a fastening strip 10 is in this case fastened on the inside to the top covering 1 by sewing, gluing or the like. Before the inserting of a new window 3 into the window opening 1' of the top covering 1, a widening strip 4' is sewn and/or glued onto the holding strip 4 of the first part of the zipper 2 by way of a seam 6' so that a wide holding strip is formed. Now the widening strip 4' of the holding strip 4 and the edge area of the fastening strip 10 which faces it are provided with a suitable adhesive and, when the folding top is almost completely folded open (this folding top must be slightly relaxed so that the window 3, after its installation, is tensioned by the subsequently completed folded-open folding top and only then will the adhesive layer 11 be stressed), the new window 3 with the U-shaped edge bordering 8 and the zipper 2 is arranged on the interior side of the (old) window to be exchanged. In this case, the outer edge of the widening strip 4' of the holding strip 4 is arranged precisely on the outer edge of the fastening strip 10 (this measure ensures an accurately fitting installation of the window 3), and then the widening strip 4' and the fastening strip 10 are pressed against one another along their whole longitudinal course. For this purpose, a wood plate or the like, which extends along the window opening 1', is arranged, for example, on the exterior side of the top covering 1, and along the widening strip 4', and a manual rolling device, such as a wallpaper rolling device or the like, is rolled off several times while generating a high contact pressure. On the other hand, when a PU-bonding agent is used, the adhesive parts (fastening strip 10 and widening strip 4') may only be held by an adhesive strip, positioning pins or the like until the bonding agent has hardened. Then, the bonding agent, which forms a layer 11 in this case, has to harden for a specific period of time. Now, the fastening seam of the window to be exchanged, which normally consists of a sewn seam, is detached, and the window and the threads are removed. Finally, the edge of the window opening 1' of the top covering 1—as explained above concerning FIG. 1—is now only inserted into the U-shaped edge bordering 8, and the top covering 1 is pressed in a surrounding manner against the sealing strip 9. By way of the now completely folded-open folding top, the newly inserted window 3 is now completely tensioned. Because of the zipper 2, it may naturally also be replaced repeatedly by a new window.

What is claimed is:

1. A window arranged to be fastened in a folding top by a zipper which has a first part with a first holding strip and a second part with a second holding strip, the first holding strip being fastened to an inner portion of a window opening of the folding top and the second holding strip being fastened to the widow, and the window has on outer sides thereof a fixedly attached edge strip surrounding the window opening of the folding top, and the edge strip is a U-shaped member being formed of resilient material to sealingly engage against a planar inner edge of the window opening of the folding top and permit replacement of the window by withdrawal of the inner edge of the window opening from the U-shaped resilient edge strip.

2. The window according to claim 1, wherein the -shaped edge is an elastic material having on an interior leg thereof a double-sided adhesive sealing strip which rests against the folding top.

3. The window according to claim 1, wherein an interior leg and an exterior leg of the U-shaped edge strip narrow toward free ends thereof.

4. The window according to claim 1, wherein the window is an approximately rectangular-shaped rear window, end sections of the zipper facing one another are disposed in the center area of a lower edge of the rear window, such that, in its installed condition, the zipper end sections are operatively associated with a securing clamp.

* * * * *